United States Patent [19]

Kluss et al.

[11] Patent Number: 4,522,235
[45] Date of Patent: Jun. 11, 1985

[54] HOSE STRUCTURE

[75] Inventors: Karl K. Kluss, Concord, N.C.; Terry F. Allen, Barberton; John M. Sawyer, Cuyahoga Falls, both of Ohio

[73] Assignee: The Goodyear Tire & Rubber Company, Akron, Ohio

[21] Appl. No.: 491,495

[22] Filed: May 4, 1983

Related U.S. Application Data

[63] Continuation of Ser. No. 320,990, Nov. 13, 1981, abandoned, which is a continuation of Ser. No. 111,070, Jan. 10, 1980, abandoned.

[51] Int. Cl.³ ............................................. F16L 11/08
[52] U.S. Cl. .................................. 138/130; 138/132; 138/174; 138/133
[58] Field of Search ............... 138/129, 130, 132, 133, 138/172, 174

[56] References Cited

U.S. PATENT DOCUMENTS

| | | | |
|---|---|---|---|
| 2,973,783 | 3/1961 | Boe | 138/130 |
| 3,447,571 | 6/1969 | Lejeune | 138/138 |
| 3,599,677 | 8/1971 | O'Brien | 138/130 X |
| 3,766,949 | 10/1973 | Champleboux et al. | 138/133 |
| 3,866,633 | 2/1975 | Taylor | 138/130 |

Primary Examiner—James E. Bryant, III
Attorney, Agent, or Firm—William A. Drucker; R. A. Thompson

[57] ABSTRACT

A hose structure resistant to pressure and vacuum as well as kinking or collapsing which exhibits good recovery from crushing includes in its wall structure elastomer embedded reinforcing cords extending in opposite hand helical patterns about the hose axis and a filler layer of elastomeric material having a thickness from about one fifth to about one fifteenth of the mean radius of the filler layer from the hose axis. The filler layer elastomeric material is of high tensile modulus and hardness and preferably includes short length fibers dispersed throughout oriented predominantly generally in the circumferential direction of the hose.

11 Claims, 7 Drawing Figures

HOSE STRUCTURE

This is a continuation of Ser. No. 320,990 filed Nov. 13, 1981 now abandoned, which was filed as a continuation of Ser. No. 111,070 filed Jan. 10, 1980, now abandoned.

This invention relates to hoses for suction and discharge purposes, such as are used for the transport of petroleum products, water, sand and gravel slurries, dredge spoil and many other liquids and slurries. These hoses must withstand pressure operations as well as vacuum operations and be resistant to kinking when bent, but at the same time form a comparatively small bend radius. It is also desirable that such hoses be resistant to crushing and exhibit recovery to a round cross-section after having been crushed.

Present constructions are usually based on a lining or tube of rubber or of like material chosen according to the material to be transported over which is applied some form of reinforcement and an outer cover of rubber or like material chosen according to the service and environment intended for the hose. Such hoses can withstand either pressure or vacuum. The reinforcement against pressure is generally a cotton or synthetic yarn which may be either woven or in cord form; alternatively, wire cords can be used for this purpose. As another alternative high denier monofilaments, in particular, (macrofil) produced by Imperial Chemical Industries Ltd have also been proposed—See British Patent Specification No. 1,293,200. The reinforcement against vacuum is usually a helix or helixes of a very heavy wire which, while resisting vacuum and external pressure, still permits the hose to flex. When such hoses are crushed they do not exhibit full recovery to a round cross-section since the helix or helixes of heavy wire takes a permanent set.

In one aspect the present invention consists in a suction and discharge hose comprising an inner tube of elastomeric material, elastomer embedded reinforcing cords extending in opposite hand helical patterns about the hose axis, at least one filler layer of elastomeric material having a tensile modulus at 50 percent elongation of about 400 to about 800 pounds per square inch and a hardness from about 70 to about 85 Shore A, said filler layer elastomeric material having a total thickness from about one fifteenth to about one fifth of the mean radius of the filler layer elastomeric material from the hose axis, and a cover layer of elastomeric material around the outer surface of the hose, the hose being cured into an integral structure.

In another aspect the present invention consists in a suction and discharge hose comprising an inner tube of elastomeric material, at least two radially spaced reinforcing layers lying outwardly of said tube, each of said layers including at least one ply of elastomer embedded reinforcing cords with the cords of each ply extending in a helical pattern about the hose axis, the cords of one ply extending in opposite hand orientation relative to the cords of another ply, a filler layer of elastomeric material having a thickness from about 30 percent to about 60 percent of the thickness of said hose, said elastomeric material being of high tensile modulus and having a hardness from about 70 to 85 Shore A, and a cover layer of elastomeric material forming the outer surface of the hose, the hose being cured into an integral cured structure.

Preferably the reinforcing cords extend in opposite hand helical patterns at an angle from about 50° to about 60° relative to the hose axis. The filler layer elastomeric material preferably has a tensile modulus at 100 percent elongation from about 700 pounds per square inch to about 1,000 pounds per square inch. The filler layer elastomeric material preferably includes from about 10 to about 18 percent by weight of discontinuous randomly distributed elongated fibers embedded therein in substantially parallel relation, the fibers being oriented so as to extend generally in a helical pattern about the hose axis. Preferably the fibers are treated to promote adhesion to the elastomeric material into which they are incorporated.

The invention will be further described with reference to the drawings accompanying the specification in which like numbers refer to like elements and suffix letters are used to distinguish between various embodiments. In the drawings.

Figure 1:
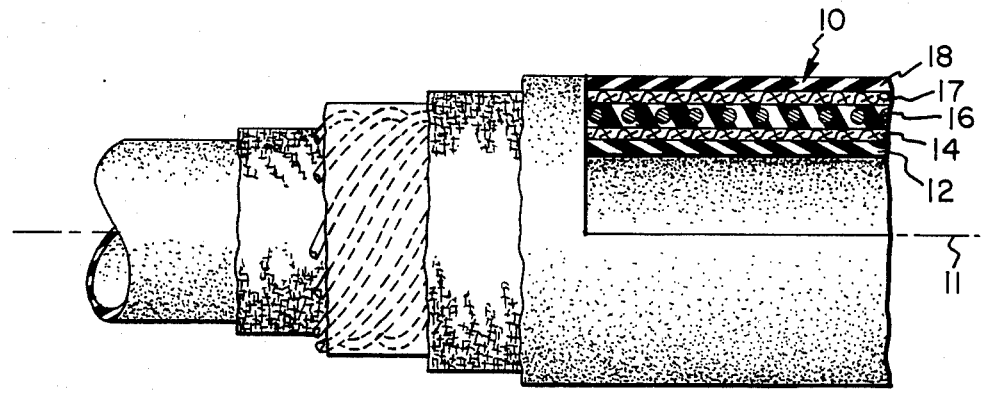
FIG. 1 is a section through part of the wall of a known type of hose.

FIG. 1 illustrates a hose 10 composed of an innermost rubber lining or tube 12, a pressure resistant reinforcement, and a rubber cover 18. The pressure resistant reinforcements 14, 17 may consist of fabric or natural textile materials, or a fabric made from synthetic textile materials, or of a layer of metallic wire filaments or cords. A heavy wire helix 16 is wound about the hose axis 11 over the reinforcement 14. Such a hose while resistant to pressure and to vacuum once crushed does not readily recover to a round cross-section due to permanent deformation of the heavy wire helix 16.

Figure 2:
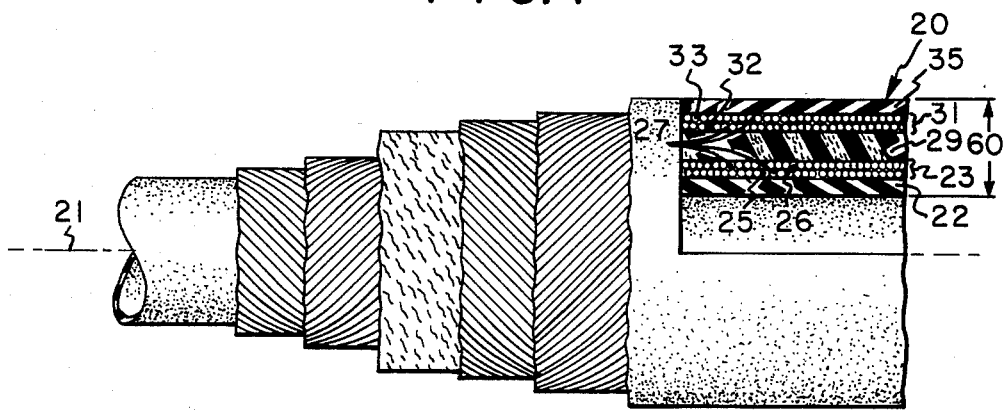
FIGS. 2–7 are corresponding sections through part of the wall of various embodiments of hose according to the invention.

FIG. 2 illustrates a section of hose wall according to a preferred embodiment of the invention. It consists successively from the inside to the outside thereof of an innermost lining or tube 22 made of natural or synthetic elastomeric material, a reinforcing layer 23 including two plies 25,26 of elastomer embedded reinforcing cords 27, the reinforcing cords 27 being applied with the major axis of the reinforcing cords at an angle of about 55° relative to the longitudinal axis 21 of the hose. The cords 27 of ply 25 extend in opposite hand orientation to the cords 27 of ply 26. Overlying the reinforcement layer 23 is a filler layer 29 of elastomeric material, the elastomeric material having a nominal tensile modulus at 50 percent elongation of about 625 pounds per square inch when measured according to ASTM D412-75 and a hardness of about 85 Shore A. Overlying the filler layer 29 is a second reinforcing layer 31 which includes two plies 32 and 33 of elastomer embedded reinforcing cords 27. The cords 27 of ply 32 and 33 extend in a helical pattern about the hose axis 21 at an angle of about 55° relative to the hose axis. The cords 27 of ply 32 extend in a helical pattern in opposite hand direction relative to the cords 27 of ply 33. A cover layer 35 of elastomeric material envelops the foregoing described components and forms the outer surface of the hose 20.

Figure 3:
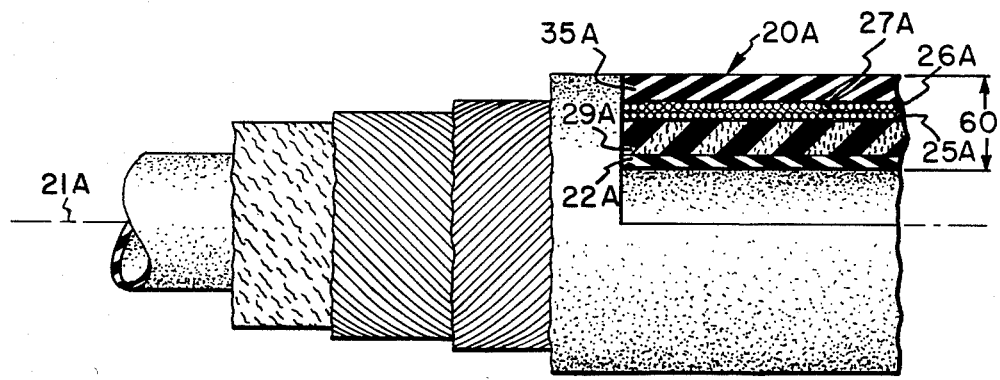

FIG. 3 illustrates a hose 20A similar to that shown in FIG. 2 except that there are no plies of reinforcing cords radially inwardly of the filler layer 29A. Reinforcement of the hose 20A is accomplished by filler layer 29A over which are wound two plies 25A and 26A of elastomer embedded reinforcing cords 27A.

Figure 4:
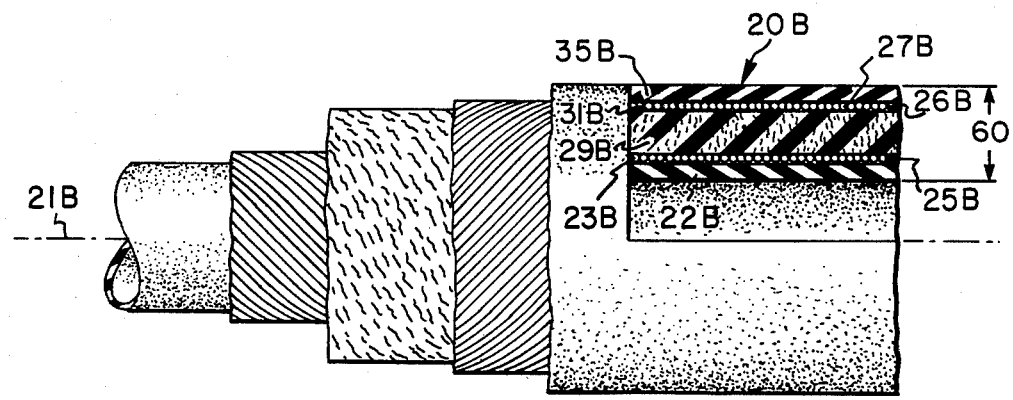

FIG. 4 illustrates a hose 20B similar to that illustrated in FIG. 2 with the exception that radially spaced reinforcing layers 23B and 31B each include only one ply 25B,26B respectively of elastomer embedded reinforcing cords. The cords 27B of plies of 25B and 26B extend in opposite hand orientation relative to the longitudinal axis 21B of the hose 20B.

Figure 5:
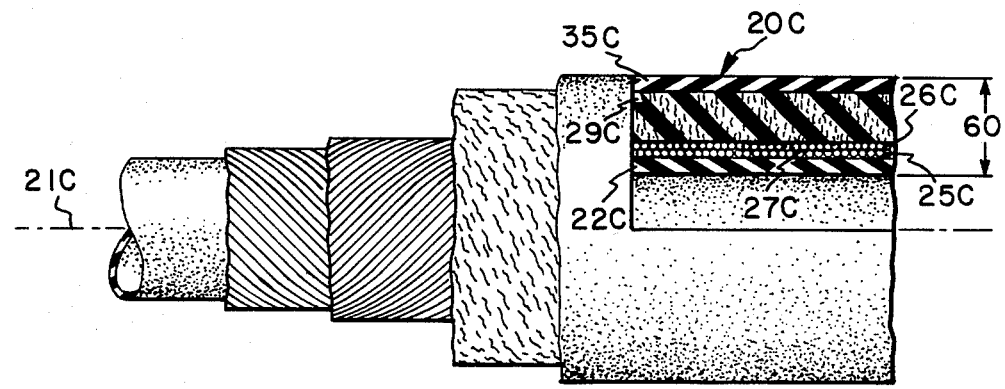

FIG. 5 illustrates a section of hose 20C in which both cord reinforcing layers 25C, 26C lie radially inwardly of the filler layer 29C which is positioned adjacent the cover 35C of the hose.

Figure 6:
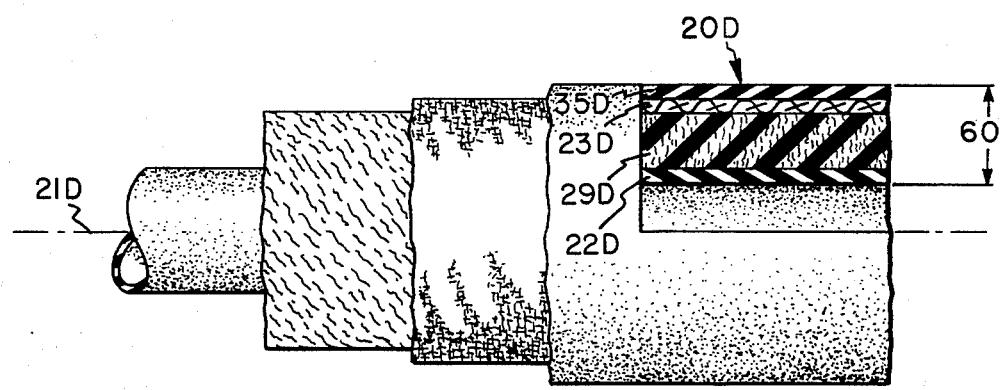
Figure 7:
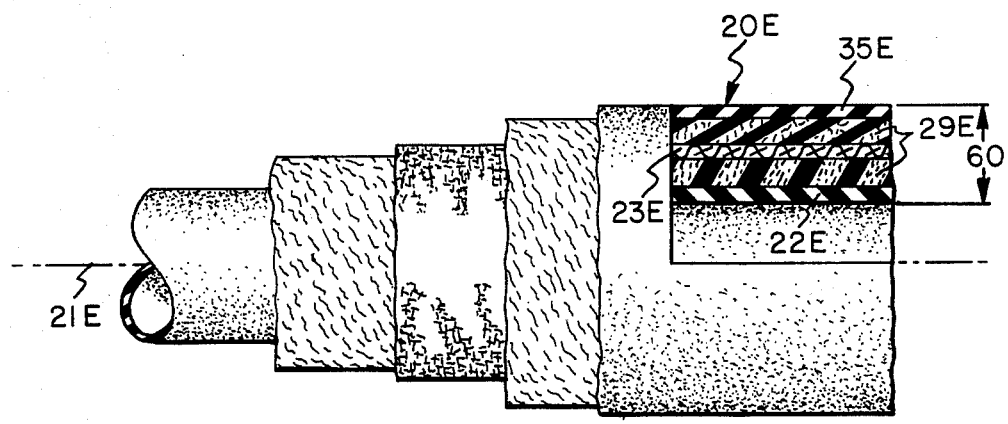

FIG. 6 illustrates a section of hose 20D in which the elastomer embedded reinforcing cords are contained in a single reinforcing layer 23D. Reinforcing layer 23D includes reinforcing cords which extend in opposite hand helical patterns about the hose axis 21D. Reinforcing layer 23 may include a fabric whose warp and weft cords are of about the same magnitude of tensile strength. The filler layer 29D could alternately be placed radially outwardly of layer 23D or divided so as to be both radially inwardly and radially outwardly of layer 23D.

It is to be understood that the Figures are representative but not exhaustive of all hose structures within contemplation of the invention. For example, the plies 25,26,32,33 of FIG. 2 could each be radially spaced from one another and include between each filler layer elastomeric material like that illustrated as single layer 29. The filler layer in such an instance is considered to be the total of all its sublayers and its thickness is determined by measuring along a radius of the hose the total of the thicknesses of each of the sublayers. The radius of the filler layer when it includes sublayers is the arithmetic means of the radius of each of the sublayers as measured from the hose axis.

The cord fabrics have been described to be applied at a cord angle of about 55° relative to the axis of the hose, but for specific purposes; for example, flexibility and kink resistance angles other than 55° may be used for some or all of the layers of reinforcing cords. The reinforcing cords will generally extend in a helical pattern about the hose axis at an angle from about 50° to about 60° relative to the hose axis.

The filler layer 29,29A,29B,29C,29D, whether a single layer of a plurality of sublayers, comprises a significant portion or percentage of the overall thickness 60 of the hose wall and is from about one fifteenth to about one fifth of the mean radius of the filler layer elastomeric material from the hose axis.

The filler layer elastomeric material preferably is from about 30 percent to about 60 percent of the thickness of the hose and most preferably from about 40 percent to 50 percent of the thickness of the hose. The filler layer is of high modulus elastomeric material. As used herein a high modulus elastomeric material is one which exhibits a tensile modulus at 50 percent elongation of about 400 to about 800 pounds per square inch when measured according to ASTM D412-75 and preferably, a tensile modulus at 100 percent elongation of about 700 to about 1000 pounds per square inch when measured according to ASTM D412-75.

The desired high modulus character of the filler layer elastomeric material may be achieved by the addition of from about 10 percent to about 18 percent by weight of elastomer of short length elongated fibers during mixing of the elastomer. Mixing of the elastomer provides random distribution of the fibers. Subsequent calendering or extrusion operations result in the fibers assuming a substantially parallel relation to the lengthwise direction of the calendered or extruded material. The calendered or extruded material is wrapped about the hose axis so as to extend in a generally helical pattern about the hose axis at an angle of about 75° relative to the hose axis. The greater the angle relative to the hose axis of the fibers of the filler layer elastomeric material, the greater the amount of circumferential restriction of the hose to expansion or collapse.

A hose similar in construction to that illustrated in FIG. 2 has been successfully constructed and evaluated. The filler layer 29 thickness was about 50 percent of the thickness 60 of the hose, the filler layer exhibited a tensile modulus at 50 percent elongation of about 625 psi when evaluated according to ASTM D412-75 and at 100 percent elongation a tensile modulus of about 871 psi, and an elongation at rupture of about 210 percent. The filler layer elastomeric material was based on a blend of neoprene and nitrile elastomers and included about 13 percent by weight of Santoweb ™ K. Santoweb ™ is a trademark of Monsanto Corporation of St. Louis, Mo. Santoweb ™ K is a short length unregenerated cellulosic fiber which has been treated to improve adhesion to the elastomeric material. These fibers have an elastic modulus of 2 to $5 \times 10^6$ psi and a tensile strength of 6 to $9 \times 10^4$ psi with an average diameter of 8 to 16 microns and a length of 1 to 3 millimeters, and a specific gravity of 1.17. Plies 25, 26 and 32, 33 were made of parallel cords 27 of five ply, 1300 denier, polyester terethphalate material which extend at an angle of about 55 degrees relative to the longitudinal axis 21 of the hose 20.

It is believed that other discontinuous fibrous material can be successfully employed to increase the modulus of the filler layer elastomeric material. The amount of loading required would, of course, be dependent upon the characteristics of the fibrous material and of the elastomeric material into which the fibers are to be incorporated. The physical properties and the thickness of the filler layer relative to the overall thickness 60 of the hose will, of course, be varied by one skilled in the art according to the particular requirements of the hose. For example, if less resistance to vacuum is contemplated, the modulus and hardness of the filler layer elastomeric material may be correspondingly lowered, the degree of fiber loading may be reduced, the type of fiber loading may be modified or the thickness of the filler layer relative to the overall thickness of the hose may be reduced. Considerations such as flexibility and kink resistance may also affect the material and proportion of the overall hose structure which is the filler layer and its position in the hose structure.

The composition of the inner tube of elastomeric material is not believed to be critical to functioning of the hose described. The man skilled in the art will realize that the inner tube elastomeric or plastic material is to be chosen on the basis of the material to be conveyed within the hose. Similarly the material to be used for the outer cover layer of the hose will not be described in detail herein as suitable compositions for hose covering will be known to the man skilled in the art and will be chosen according to the intended application of the hose. As used herein the term "elastomeric" as applied to the material of the inner tube and cover layer of a hose is to be interchangeable with plastic. Plastics such as polyethylene and polyvinyl chloride have been used for hose tubes and covers. The plies of elastomer embedded reinforcing cords are preferably elastomer impregnated or embedded prior to assembly of the hose. The cords may be of textile or metallic wire material and by way of example but without limitation may include rayon, nylon, polyester, aramid, fiberglass and steel. Polymeric macrofilament material may be used.

The elastomeric materials of each layer used should of course be designed so as to be adherent to any other layer with which it is in contact on curing of the hose into an integral structure. Bridging or tying layers may be used to facilitate joining of two layers which otherwise may be incompatible.

One skilled in the art will readily appreciate that the thickness of the fiber loaded layer as a percentage of the total wall thickness of the hose may be reduced if higher modulus elastomeric material is employed.

In hose of general construction similar to FIG. 2 it is preferred that each of the plies 25, 26, 32, 33 be of opposite hand orientation relative to any adjacent ply. However, it is only required that there be at least one ply whose cords extend in an opposite hand relation relative to the cords of the remainder of the plies. The cord plies 25B, 26B in the embodiment of the FIG. 4 preferably extend in opposite hand relation relative to the hose axis 21B.

Opposite hand orientation as used herein means that the elements or cords referred to extend about the hose axis in spiral fashion at opposite sense helix angles relative to the axis of the hose.

While certain representative embodiments and details have been shown for the purpose of illustrating the invention it will be apparent to those skilled in this art that various changes and modifications may be made therein without departing from the spirit or scope of the invention.

The attached abstract is not to be taken as limiting the invention of this application and in order to understand the full nature and extent of the technical disclosure of this application reference must be made to the accompanying drawings and detailed description.

What is claimed is:

1. A suction and discharge hose having a central longitudinal axis and comprising:
   (i) an inner tube of elastomer material;
   (ii) a cover layer of elastomeric material spaced radially outwardly of said inner tube and forming an outer surface for the hose;
   (iii) at least one reinforcing layer of elastomer having embedded therein reinforcing cords extending in opposite hand helical patterns about the hose axis;
   (iv) at least one filler layer disposed intermediate said inner tube and said cover layer and being separate and distinct from said inner tube and from said cover layer and from said at least one reinforcing layer, said filler layer being of elastomeric material having a tensile modulus at 50 percent elongation of about 400 to about 800 pounds per square inch and a hardness from about 70 to about 85 Shore A, said filler layer elastomeric material having a total thickness from about one fifteenth to about one fifth of the mean radius of the filler layer elastomeric material from the hose axis;
   (v) from about 10 to about 18 percent by weight discontinuous elongated fibers embedded in randomly distributed manner in substantially parallel relation in said filler layer, said fibers being oriented so as to extend generally in a helical pattern about the hose axis at an angle of at least 45° relative to the hose axis so as to reinforce the hose against collapse.

2. A hose, according to claim 1, having at least two radially spaced reinforcing layers lying outwardly of said tube, each of said layers including at least one ply of elastomer embedded reinforcing cords with the cords of each ply extending in a helical pattern about the hose axis at an angle from about 50 degrees to about 60 degrees relative to the hose axis, the cords of one ply extending in opposite hand orientation relative to the cords of another ply.

3. A hose according to claim 2 in which filler layer elastomeric material lies both radially inwardly and radially outwardly of at least some of the reinforcing cords.

4. A hose according to claim 2 in which the filler layer elastomer predominently lies between the radially spaced reinforcing layers.

5. A hose according to claim 1 or claim 2 in which the filler layer elastomeric material has a tensile modulus at 100 percent elongation from about 700 to about 1000 pounds per square inch.

6. A hose according to claim 1 or claim 2 in which the filler layer elastomeric material has a tensile strength from about 700 to about 1500 pounds per square inch, and an elongation at rupture from about 100 to about 300 percent.

7. A hose according to claim 1 in which the filler layer elastomeric material includes about 13 percent by weight of fibers.

8. A hose according to claim 1 in which the fibers are of short length cellulosic material treated to promote adhesion to the elastomeric material into which they are incorporated.

9. A hose according to claim 1 in which each reinforcing layer includes two plies of elastomeric embedded reinforcing cords.

10. A hose according to claim 1 in which the fibers extend at an angle of about 75° relative to the hose axis.

11. A hose according to claim 1 in which the filler layer is from about 30 to about 60 percent of the thickness of the wall of said hose.

* * * * *